Feb. 9, 1971     A. J. SCHMIDT     3,561,265
MEANS FOR THE MEASUREMENT OF THE ENERGY
OF ELECTROMAGNETIC RADIATION

Filed Dec. 19, 1967     2 Sheets-Sheet 1

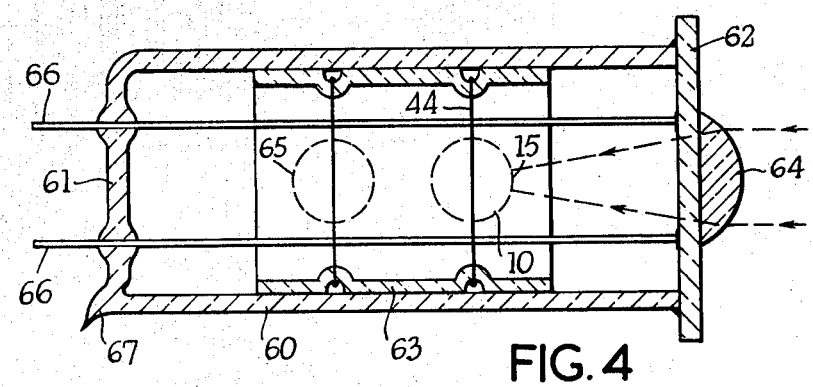
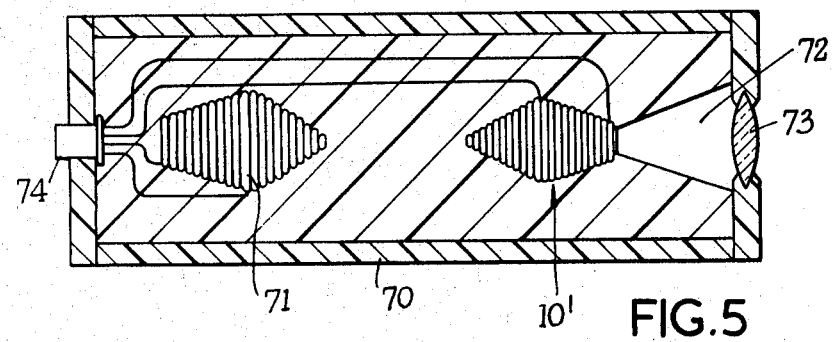
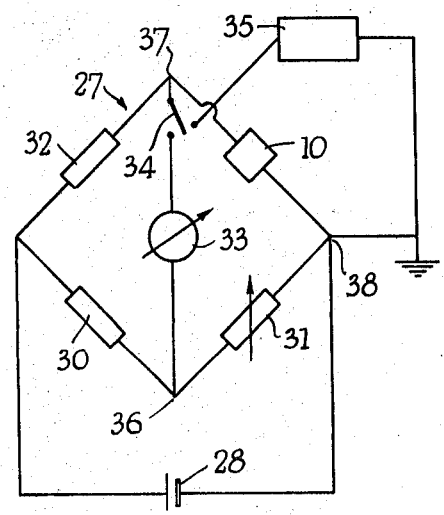

United States Patent Office 3,561,265
Patented Feb. 9, 1971

3,561,265
MEANS FOR THE MEASUREMENT OF THE ENERGY OF ELECTROMAGNETIC RADIATION
Arnold Johann Schmidt, 4 Spring Lane, Heslington, York, Yorkshire, England
Filed Dec. 19, 1967, Ser. No. 691,798
Claims priority, application Great Britain, Dec. 19, 1966, 56,608/66
Int. Cl. G01k 17/00
U.S. Cl. 73—190
13 Claims

ABSTRACT OF THE DISCLOSURE

An apparatus for measuring the energy of electromagnetic radiation, such as a laser pulse, comprising a hollow body the wall of which is made up of a continuous length of wire which is tangled or wound so as to be opaque to the radiation, and means for measuring a change in the electrical resistance of the wire resulting from heating by an incident beam of the radiation entering through the inlet of the body.

---

Figure 1:
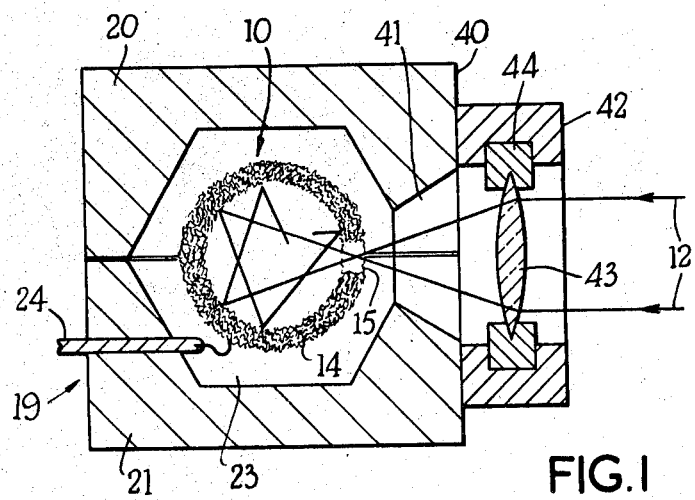

The present invention relates to improvements in means for the measurement of electromagnetic radiation. More particularly it relates to apparatus for performing highly accurate absolute measurements of the energy content of beams emitted by lasers.

One of the common techniques of measuring the energy content or output of a laser is to measure the change in resistance of an insulated wire tangled into a ball when exposed to radiation. Such a ball of tangled insulated wire is known as a "rats nest." This technique is very convenient and is effective within energy ranges of 1 millijoule to 0.5 joule. The rats nest acts in fact as a calorimeter and before it can be used to make absolute measurements of the energy output of lasers, it must be calibrated, either by theoretical calculation or by experimental comparison with radiation sources of known intensities and frequencies.

Since estimating the absorptivity of a tangled ball of wire is very difficult, the calorimeter must be calibrated experimentally. However, the calibration of such calorimeters is difficult, particularly if the energy beam is produced by a pulsed solid state laser. The difficulties arise in the main from two factors; firstly the intensities of the calibration sources are several orders of magnitude lower than those of the lasers, the energy output of which is to be measured, and secondly the absorption of the wire rats nest forming the calorimeter varies very strongly with the wavelength of the radiation incident upon it, due to the nature of the insulating material applied to the wire. Both these factors have a marked effect on the accuracy of the calibration and therefore on the accuracy of any subsequent measurement made with the calorimeter.

Typical radiation sources which are used in the calibration of such calorimeters are lamps of known intensities, their intensities varying in a known manner with the wavelengths of the radiation produced by them. An ideal calibration source would be a black body radiator. However, in practice, the lamps used are themselves calibrated against a black body radiator before being used for calibration.

The invention is aimed at producing a calorimeter which can be calibrated with greater certainty, leading to more accurate results, and as far as possible to simulate a black body absorber.

According to one aspect of the invention there is provided apparatus for measuring the energy of electromagnetic radiation comprising a hollow body the wall of which is substantially opaque to the radiation, the body being thermally insulated from its surroundings and being provided with an inlet in the wall, through which a beam of the radiation can enter, the body being shaped so as to be substantially nonreflective through the inlet and being composed of electrically conductive material arranged so that a change in electrical resistance in discrete areas of the wall, as a result of heating of the areas by an incident beam of the radiation entering through the inlet, is measurable and further includes apparatus as defined above wherein the interior of the housing is evacuated.

Preferably the body is made up of an electrical conductor, which is homogeneous and of uniform cross-section, and insulated against electrical contact between any side surface areas.

The body is preferably of spherical shape and may be made from a tangled web of wire. Insulated copper wire is suitable for this purpose, but in the case of thin enamelled copper wire, damage to the insulation occurs with beam energies in excess of about 0.5 joule. This limit can be increased through the use of aluminium wire coated with an insulating layer of aluminium oxide. While it is contemplated that spherical bodies may be made with such aluminium wire, the wire is more brittle than copper wire and it is therefore more convenient to wind the wire spirally to form a body. The body is in this case definitely shaped as two cones arranged base to base.

Figure 2:
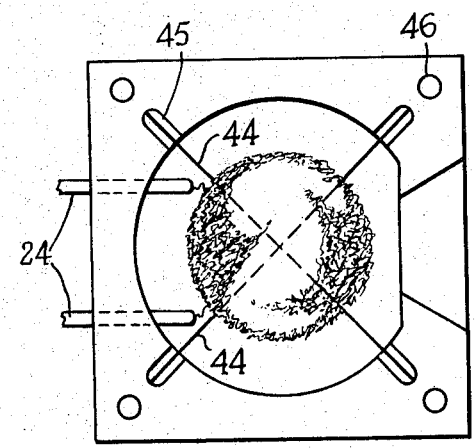
Figure 3:
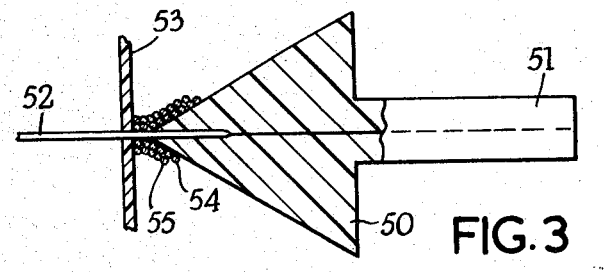

Preferred embodiments of the apparatus and instrument of the invention and which illustrate the method, are hereafter more particularly described with reference to the accompanying drawings, in which:

FIG. 1 is a vertical cross-sectional view of one form of apparatus in accordance with the invention, FIG. 2 is a plan view of the lower housing portion of the apparatus of FIG. 1, FIG. 3 is a diagram illustrating the winding of a cone-shaped, spirally wound body, FIG. 4 is a vertical sectional view of another form of apparatus in accordance with the invention, FIG. 5 is a vertical sectional view of yet another form of apparatus in accordance with the invention, and FIG. 6 is a circuit diagram illustrating how the apparatus is connected to suitable components in an instrument.

In FIG. 1 is shown a calorimeter body 10 in the form of a hollow sphere shaped from a tangled web of a single length of insulated wire 14. A hole 15 is formed in the wall of the hollow sphere, the area of which is so small as to be insignificant compared with the internal surface of the sphere. Incident radiation which may be in the form of a parallel beam is focussed on the hole 15 by means of a lens 43 placed a suitable distance from the hole 15. The parallel beam of radiation 12 may be emitted, for example, from a pulsed solid state laser (not shown). The focussed rays of the radiation 12 pass into the interior of the hollow sphere and are reflected from part of the wall to another as illustrated in FIG. 1 until they are completely absorbed by the wall. To this end the wall of the tangle 14 must be sufficiently thick to ensure that it is opaque to the radiation, i.e. so that no radiation can escape through them.

The partial absorption of the incident radiation by the wire tangle 14 at any point, strictly speaking at any discrete area, causes the temperature of the wire at that point to rise and thus the resistance of the wire changes by a measurable amount. The change in resistance is accurately measured by a Wheatstone bridge and is directly related to the energy of the incident radiation regardless of its wavelength. The thickness of the wall of the tangle 14 for opacity is however dependent upon the wavelength of the incident radiation because the wire at any point is not a perfect absorber and there is a significant amount of scatter of the radiation on each collision of the latter on the interior wall surface.

The body 10 of FIGS. 1 and 2 is formed as follows. A tangled disc of 1½ inch diameter was formed from 0.5 g. 50 SWG insulated copper wire and wrapped around a sphere of paraffin wax, ½ inch in diameter and mounted on a rod, the diameter of which is sufficient to form the entrance hole to the rats nest. The paraffin wax is then removed by dissolving it in a suitable solvent. The hollow sphere of tangled wire is self-supporting and has a resistance of approximately 6,500 ohms.

The body 10 is mounted in a cavity 23 in a generally cubic housing 19. The cavity is formed by dividing the housing 19 along a plane parallel to one side and bisecting adjacent sides. The abutting surfaces of the respective sections 20, 21 thus formed are drilled to form two frusto-conical cavities in them, the bases of the cavities being parallel to the abutting surfaces.

The front face 40 of the housing 19 is formed with an inwardly tapering frusto-conical aperture 41 and facing the entrance to the aperture 41 is a suitable lens housing 42 in which a lens 43 is shown diagrammatically mounted by means of a sealing ring 44. The mounting of the body 10 within the housing 19 is illustrated better in FIG. 2. Two nylon threads 44 are passed diametrically through the body at right angles to one another and the ends of the threads are adhered by suitable adhesive within recesses 45 in the abutting surface of a lower housing section 21.

The housing sections are bolted together by bolts passing through suitable bores 46 (FIG. 2) at the corners, if necessary with the interposition of gasket material. The lens housing 42 is bolted in place in a similar way, also with the optional insertion of gasket material, so that the interior of the housing can be made vacuum tight. The interior of the housing is preferably evacuated and this may be accomplished by welding a copper tube in one of the walls and blocking the tube after a vacuum is applied thereto. The housing may alternatively be mounted in an evacuated glass vessel.

The body is mounted as shown in FIG. 1 with its inlet aperture 15 aligned with the axis of the lens 43 and facing the lens, and at the focal plane of the lens. The ends of the wire 14 are connected to connector pins 24 which are sealed with appropriate insulation through the walls of the lower housing section 21.

As with a conventional rats nest calorimeter, the sensitivity of an apparatus according to the present invention is proporational to $a/qsld^2$ where:

$a$ is the temperature coefficient of the wire
$q$ is the density of the wire
$s$ is the specific heat of the wire
$l$ is the length of the wire
$d$ is the diameter of the wire The apparatus can be calibrated by comparing the in resistance of the wire caused by incident radiation with that caused by a current of known amperage passed through the wire for a given time. The apparatus can be used in conjunction with a pulsed solid state laser, or a chopped beam from a C. W. laser the calibration is complicated by the fact that the cooling time of the calorimeter is not infinite. This can be overcome by applying the calibration current in pulses which, like the laser pulses, are short compared to the time required to heat up the body and for a galvanometer to respond. The thermal insulation of the body ensures that the heat produced by the pulse is not dissipated before the galvanometer responds.

In use, the ends of the wire 14 are connected in a Wheatstone bridge circuit as shown in FIG. 6. The circuit comprises two standard resistances of known values connected together in series to form one arm of the bridge and which are indicated in the figure by the numerals 30 and 32.

The other arm of the bridge is formed by the calorimeter 10 and variable resistance 31. A galvanometer 33 is connected to the bridge at points 36 and 37, a two-way switch 34 being inserted between the galvanometer 33 and point 37 on the bridge circuit. A pulse generator 35 is connected to the other arm of the two-way switch 34 and to the point on the bridge circuit indicated by the numeral 38, which is also connected to ground. By means of the two-way switch 34, the galvanometer 33 may be isolated from the bridge circuit 27 when a pulse is passed through the calorimeter body 10 so that the currents thus induced will not damage the galvanometer 33.

With a body resistance of 6,500 ohms, suitable components in the circuit of FIG. 6 are as follows:

Component 32: 6.5 kiloohms
Component 30: 6.5 kiloohms
Component 31: 6.5 kiloohms (maximum)
Component 28: supplied a current of 1 to 2 milliamps.

In the resulting instrument, the cooling time after excitation is of the order of two minutes. A galvanometer may be used at position 33, e.g. a Scalamp galvanometer (sensitivity of the order of 1.29 millivolts/mm.) may be used.

The two-way switch 34 may be a relay switch, the relay being placed for example in a time delay circuit such as a condenser discharge circuit to protect the galvanometer during a calibration pulse. The pulse duration may be of the order to 1 to 10 milliseconds.

However, it is preferred to use a Keithely 150B micro-millivoltmeter. This gives the following full scale deflections at the different incident beam energies and 2 ma. bridge current:

3 mj. full scale at 100 $\mu$v.
300 $\mu$j full scale at 10 $\mu$v.
100 $\mu$j full scale at 3 $\mu$v.

The accuracy of the apparatus is limited by two factors:

(1) The ratio of entrance hole cross-sectional area to the total surface area of the interior of the hollow sphere. This is made as small as conveniently possible and the expression "insignificant" as used in this context means that the ratio introduces no appreciable error at the degree of precision to which the apparatus or instrument is instructed. Clearly, for low precision instruments, a greater degree of latitude will be available than for high precision instruments.

(2) The stability of the Wheatstone bridge circuit (to be described) and the accuracy with which the parameters of the calibration pulse are known. Both these factors may be controlled.

In the instruments described with reference to FIGS. 1 and 2 and FIG. 6, while the insulation may stand energies about .5 joules, the body is suitable mainly for measuring the output of gas lasers, which have an output down to 10 microwatts. For measuring the energy output of a solid state laser such as ruby lasers which may have an output of between 1 and 10 joules, it is preferred to construct the body of oxide-coated aluminium wire.

Since the wire is brittle, it may be wound to conical form as illustrated in FIG. 3. Use is made of a former 50 which may be of plastics material, and which has a conical end and a handle 51. Into the apex of the cone is driven a needle 52 which is also passed through a plate 53 of plastics material. It will be appreciated that the components of FIG. 3 are out of proportion, the wire being suitably of 39 SWG or as fine a grade as available and the needle being extremely thin. The wire is wound in a first spiral layer 54, beginning by winding it around the needle, and building up the layer of the conical former 50. The plate 53 prevents the layer from falling off the former. A second layer 55 is then built up on the first layer in such a way as to fill in the spaces between the coils of the first layer and the resulting double layer structure is sufficiently opaque. It has been found that, with cone angles of 45°, winding is easier than with cone angles of 50° to 60°, but the latter are generally better.

The cones so formed are arranged base to base as shown at 10′ in FIG. 5. The cones may be adhered with dabs of adhesive, and strips of adhesive are preferably laid across the coils to give rigidity to the structure.

The two cones are connected in series to form a single continuous coil. Suitable wire is 39 SWG anodised aluminum wire. In general, it may be said that a wire thinner than 30 SWG is to be preferred. The cones may for example be ¾″ long. A pair of cones of this size and grade of wire provide a combined resistance of about 50 ohms. The inlet for the radiation can be formed at the apex of one of the cones as shown, by spreading the wire slightly at the apex or by starting to wind a little way back from the apex, or by cutting the wire at the apex.

The double cone 10′ may be mounted in an analogous manner to that shown in FIG. 1. However, preferred arrangements for housing the calorimeter bodies are illustrated in FIGS. 4 and 5. In these figures, it will be seen that a pair of bodies are housed with thermal insulation in a common housing. One of the bodies in each case is a calorimeter body 10, 10′ of the kind described, and the second body in each case is a reference body, constructed as far as conveniently possible identically with the main body and constituting the balance resistance 32 shown in FIG. 6. By providing a balance resistance of the same material type and under the same conditions as the calorimeter body, errors arising in calibration are largely cancelled out, and the stability of the bridge is greatly improved.

In FIG. 4, the housing comprises a glass cylinder 60, closed at the rear end 61 and welded or adhered at the front to a glass plate 62. Mounted centrally to the front face of the glass plate 62 is a lens 64 which may, as shown, be flat-sided and adhered directly to the plate 62 by adhesive of suitable refractive index. The calorimeter body 10 is suspended by nylon threads 44 as shown from an inner glass cylinder 63. The balance body 65 is also suspended from the cylinder 63, which is slid into place so that the inlet 15 is at the focal length of the lens 64, and adhered in position, before the front plate 62 is fixed in place.

The ends of the wires from the body 10 and balance body 65 are connected to four pins 66 sealed into the rear end 61 of the cylinder 60 and the cones may be adhered to the front plate 62. When the assembly is complete, the cylinder 60 is evacuated at the elbow 67.

In the arrangement shown in FIG. 5, the vacuum insulation has been replaced by filling the entire interior of the housing 70 with foamed polystyrene or similar expanded plastics material having good insulation properties and which is preferably rigid. This insulation material is sufficient itself to maintain the body 10′ and balance body 71 in position. The material is cut away at 72 to provide a frusto-conical entrance for the light beam. The housing can be constructed of any suitable material such as plastics and the lens shown at 73 can be mounted in any desired manner. The bodies can be initially held in place on a suitable frame work, while the plastics material is foamed in situ around them, or the insulation can be made in two semi-cylindrical portions formed with suitable recesses. The ends of the wires may be led to a suitable four-pin socket shown at 74.

It will be apparent that, in the embodiments of FIGS. 1, 4 and 5, the components in one embodiment may be interchanged with those of another if desired, and the operation and assembly of the embodiment of FIGS. 4 and 5 may be carried out as described with reference to FIGS. 1 to 6. It is contemplated that the apparatus may be sold in the form of units as illustrated in FIGS. 1, 4 or 5, or may be completely assembled as a self-sufficient instrument with the various components necessary to provide the circuit shown in FIG. 6. If it is adapted for operation from a mains source, a suitable power pack will be necessary, as is well known.

While embodiments suitable for use with gas lasers and solid state lasers have been described, it will be apparent that the invention may be adapted to lasers of higher output, through the use of suitable attenuators. Various modifications may be made to the embodiments shown within the scope of the claims.

While it is not to be recommended for instruments of high precision, much of the benefit of the invention may be obtained by utilising a calorimeter body in the form of a single cone, open at the base for entry of the beam of radiation, and closed at the apex. The body will then resemble half of one of the bodies illustrated in FIG. 5. Very little radiation will be reflected through the inlet, although this is comparatively large, since the direction of reflection and re-reflection of each part of the beam is generally towards the apex of the cone. Similarly it is not always necessary to employ a lens or to focus exactly at the inlet, since laser beams may be of very small cross-section.

What I claim is:

1. Apparatus for measuring the energy of electro-magnetic radiation comprising a housing, a hollow body located within said housing and being thermally and electrically insulated therefrom, said hollow body being formed of an insulated, fine continuous electrical linear conductor, said body being of sufficient thickness so as to be substantially opaque to the radiation, said body and said housing having aligned inlets through which a beam of radiation can enter, said body having an interior surface on which said beam is incident, said body being effective to internally reflect and absorb the energy of said beam so as to prevent the reflection of received radiation back through the body inlet, and means for measuring a change in the electrical resistance of said conductor resulting from heating by the absorption of energy of the incident beam of radiation entering through said body inlet.

2. Apparatus as claimed in claim 1 wherein the body is formed substantially as a single cone, open at the base to allow entry of the incident beam of radiation.

3. Apparatus as claimed in claim 1 wherein the body is essentially a closed sphere, and comprising means for focusing a beam at said body inlet, the inlet being of a size only sufficient to allow a beam of radiation focussed thereat to enter into the interior of said sphere.

4. Apparatus as claimed in claim 1 wherein said body is formed of a web of tangled wire.

5. Apparatus as claimed in claim 4 wherein said conductor is composed of insulated copper wire.

6. Apparatus as claimed in claim 4 wherein said body is substantially spherical.

7. Apparatus as claimed in claim 1 wherein said conductor is composed of oxide aluminum wire.

8. Apparatus as claimed in claim 7 wherein said body is formed as two cones arranged base to base.

9. Apparatus as claimed in claim 8 wherein said body is formed of spirally wound wire.

10. Apparatus as claimed in claim 1 further comprising a balance resistor shaped and structured similarly to said hollow body, located within said housing and being thermally and electrically insulated therefrom, thermally insulated from said body and electrically connected thereto.

11. Apparatus as claimed in claim 10 wherein the interior of the housing is evacuated.

12. Apparatus as claimed in claim 10 wherein the housing inlet comprises focussing means adapted to focus a parallel beam of incident radiation at said body inlet.

13. Apparatus as claimed in claim 10 wherein said measuring means includes a galvanometer arranged in a Wheatstone Bridge circuit with said body and balancing resistors included on separate arms of said bridge.

References Cited

UNITED STATES PATENTS

| | | | |
|---|---|---|---|
| 3,282,100 | 11/1966 | Baker | 73—190 |
| 3,287,975 | 11/1966 | Mason et al. | 73—355 |
| 3,303,340 | 2/1967 | Hewett et al. | 73—355 |
| 3,313,154 | 4/1967 | Bruce | 73—355 |
| 3,368,076 | 2/1968 | Clifford et al. | 73—355 |
| 3,461,290 | 8/1969 | Webb | 73—355 |

JAMES J. GILL, Primary Examiner

H. GOLDSTEIN, Assistant Examiner